United States Patent
Maekawa et al.

(10) Patent No.: US 7,777,474 B2
(45) Date of Patent: Aug. 17, 2010

(54) DC-DC CONVERTER WITH OSCILLATOR AND MONITORING FUNCTION

(75) Inventors: Yukinori Maekawa, Kasugai (JP); Yoshihiro Nagaya, Kasugai (JP); Keita Sekine, Kasugai (JP); Takashi Matsumoto, Kasugai (JP); Takehito Doi, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 477 days.

(21) Appl. No.: 11/790,693

(22) Filed: Apr. 26, 2007

(65) Prior Publication Data
US 2007/0285074 A1    Dec. 13, 2007

(30) Foreign Application Priority Data
Jun. 9, 2006    (JP)    ............................... 2006-161665

(51) Int. Cl.
*H03K 4/50*    (2006.01)
(52) U.S. Cl. ........................... 323/288; 327/132; 331/62
(58) Field of Classification Search ................. 323/288, 323/242, 326, 354; 327/132, 131, 133–139; 331/62
See application file for complete search history.

(56) References Cited

U.S. PATENT DOCUMENTS

| 6,680,656 | B2 * | 1/2004 | Chen ........................... 331/143 |
| 6,696,821 | B2 * | 2/2004 | Haraguchi et al. ........... 323/222 |

FOREIGN PATENT DOCUMENTS

| CN | 1663101 A |   | 8/2005 |
| JP | 63244927 A | * | 10/1988 |
| JP | 04334114 A | * | 11/1992 |
| JP | 2005-117784 |   | 4/2005 |
| WO | WO 2004/107546 A1 |   | 12/2004 |

* cited by examiner

*Primary Examiner*—Harry Behm
(74) *Attorney, Agent, or Firm*—Fujitsu Patent Center

(57) ABSTRACT

A DC-DC converter for converting an input voltage and generating an output voltage. The DC-DC converter includes an adjustment resistor. A control circuit generates a control signal and includes an external terminal to which the adjustment resistor is externally connected. A switching transistor is connected to the control circuit and turned on or off in accordance with the control signal. The control circuit includes an oscillator that generates an oscillation signal. The control circuit generates the control signal based on the oscillation signal and a signal that is in accordance with an output voltage or output current of the DC-DC converter. The oscillator monitors a first amount of current flowing through the external terminal of the control circuit and generates the oscillation signal in a cycle that is accordance with the monitoring result.

18 Claims, 6 Drawing Sheets

DC-DC CONVERTER WITH OSCILLATOR AND MONITORING FUNCTION

CROSS-REFERENCE TO RELATED APPLICATIONS

This application is based upon and claims the benefit of priority from prior Japanese Patent Application No. 2006-161665, filed on Jun. 9, 2006, the entire contents of which are incorporated herein by reference.

BACKGROUND OF THE INVENTION

The present invention relates to a DC-DC converter, a control circuit for a DC-DC converter, and a method for controlling a DC-DC converter.

A portable electronic device, such as a notebook personal computer or a game machine, incorporates a plurality of semiconductor integrated circuit (IC) devices. Each semiconductor IC device uses a battery as its power supply. The output voltage of a battery decreases as the battery is discharged. To keep the operating power supply voltage constant, a portable electronic device includes a DC-DC converter. The DC-DC converter includes an integrated control circuit and components connected to the control circuit such as an output transistor. If an impact is applied to the portable electronic device, this may disconnect a component from the DC-DC converter and cause the DC-DC converter to function erroneously. Such erroneous functioning of the DC-DC converter must be prevented.

A conventional switching type DC-DC converter includes a control circuit, a first transistor to which an input voltage is applied, and a second transistor connected to the first transistor. The first transistor and the second transistor are alternately turned on and off based on an oscillation signal having a triangular waveform that is generated by an oscillator arranged in the control circuit. The voltage at a node between the two transistors is output as an output voltage via a choke coil. The control circuit compares the output voltage and the oscillation signal and generates a pulse signal for turning the transistors on and off. In this way, the DC-DC converter stabilizes its output voltage by changing the duty ratio of the pulse signal according to the output voltage.

In the switching type DC-DC converter, the first and second transistors and the choke coil are external components connected to the integrated control circuit. When an external component is mounted in a defective manner or an output circuit formed by an external component is short-circuited, the DC-DC converter determines that its voltage boost is insufficient, and operates to increase the output voltage. In this case, the DC-DC converter may output an abnormally high voltage or may cause a flow of overcurrent. To prevent the occurrence of such an abnormal state, a power supply circuit proposed in the prior art (refer, for example, to Japanese Laid-Open Patent Publication No. 2005-117784) monitors the output voltage of a DC-DC converter and stops providing transistors with a switching signal when a failure occurs in the DC-DC converter. This prevents the power supply circuit from increasing the output voltage abnormally in the DC-DC converter.

In the DC-DC converter of the prior art described above, the cycle in which the first transistor and the second transistor are turned on and off is determined by the frequency of the oscillation signal. Further, the cycle in which the first transistor and the second transistor are turned on and off differs depending on the output voltage of the DC-DC converter or the application of the DC-DC converter. Thus, the control circuit is formed so that it can freely change the frequency of the oscillation signal. In detail, a resistor is connected as an external component to an integrated control circuit, and the oscillator charges or discharges its internal capacitor in accordance with the current flowing through the resistor. The charging and discharging time of the capacitor determines the frequency of the oscillation signal. In this case, the frequency of the oscillation signal is changed by changing the resistance of the resistor that is externally connected to the control circuit.

SUMMARY OF THE INVENTION

A portable electronic device on which a plurality of semiconductor IC devices and a DC-DC converter functioning as a power supply are mounted is expected to be often carried by a user. This means that the portable electronic device has a high chance of being inadvertently dropped during use. Further, the portable electronic device may often be carried from a cold environment to a warm environment. This will often cause condensation to form on the portable electronic device.

In the portable electronic device, the DC-DC converter changes the oscillation frequency and a resistor for changing the oscillation frequency may become disconnected, for example, when the device is dropped due to the impact applied to the device. Further, condensation forming on the device may cause a terminal connected to the resistor and a terminal of the power supply to be short-circuited. When such a failure occurs in the resistor that determines the oscillation frequency, the charging of a capacitor and the oscillation of the oscillator may stop. In such a case, the comparison between the oscillation signal and the voltage based on the output voltage may lead to an indefinite result, and the operation of the DC-DC converter may become unstable. Further, the DC-DC converter may function erroneously such that the on-state of the first transistor to which the input voltage is applied continues.

One aspect of the present invention is a switching type DC-DC converter for converting an input voltage and generating an output voltage. The DC-DC converter has an adjustment resistor, a control circuit that generates a control signal and includes an external terminal to which the adjustment resistor is externally connected, and a switching transistor connected to the control circuit and turned on or off in accordance with the control signal. The control circuit includes an oscillator that generates an oscillation signal. The control circuit generates the control signal based on the oscillation signal and a signal that is in accordance with an output voltage or output current of the DC-DC converter. The oscillator monitors a first amount of current flowing through the external terminal of the control circuit and generates the oscillation signal in a cycle that is accordance with the monitoring result.

A further aspect of the present invention is a switching type DC-DC converter for converting an input voltage and generating an output voltage. The DC-DC converter has an adjustment resistor, a control circuit that generates a control signal and includes an external terminal to which the adjustment resistor is externally connected, and a switching transistor connected to the control circuit and turned on or off in accordance with the control signal. The control circuit includes an oscillator that generates an oscillation signal. The control circuit generates the control signal based on the oscillation signal and a signal that is in accordance with an output voltage or output current of the DC-DC converter. The oscillator includes a window comparator having first and second reference voltages and receiving voltage corresponding to a first amount of current flowing through the external terminal of the control circuit to compare the received voltage with the first and second reference voltages and generate a switch signal in accordance with the comparison result. The oscillator further includes first and second constant current supplies and a switch that is controlled to perform switching in accordance with the switch signal. The switch includes a first switch contact point connected to the adjustment resistor, second and third switch contact points respectively connected to the first and second constant current supplies, and a fixed contact point selectively connected to one of the first to third switch contact points. The oscillator generates the oscillation signal in a cycle that is in accordance with one of the first current amount, a second amount of current flowing through the second switch contact point, and a third amount of current flowing through the third switch contact point.

Still another aspect of the present invention is a control circuit incorporated in a switching type DC-DC converter for converting an input voltage and generating an output voltage. The DC-DC converter includes an adjustment resistor and a switching transistor. The control circuit includes an external terminal to which the adjustment resistor is externally connected and an oscillator for generating an oscillation signal. The control circuit generates a control signal based on the oscillation signal and a signal that is in accordance with an output voltage or output current of the DC-DC converter to turn the switching transistor on or off. The oscillator monitors a first amount of current flowing through the external terminal and generates the oscillation signal in a cycle that is accordance with the monitoring result.

A further aspect of the present invention is a control circuit incorporated in a switching type DC-DC converter for converting an input voltage and generating an output voltage. The DC-DC converter includes an adjustment resistor and a switching transistor. The control circuit includes an external terminal to which the adjustment resistor is externally connected and an oscillator for generating an oscillation signal. The control circuit generates a control signal based on the oscillation signal and a signal that is in accordance with an output voltage or output current of the DC-DC converter to turn the switching transistor on or off. The oscillator includes a window comparator having first and second reference voltages and receiving voltage corresponding to a first amount of current flowing through the external terminal to compare the received voltage with the first and second reference voltages and generate a switch signal in accordance with the comparison result. The oscillator further includes first and second constant current supplies and a switch that is controlled to perform switching in accordance with the switch signal. The switch includes a first switch contact point connected to the adjustment resistor, second and third switch contact points respectively connected to the first and second constant current supplies, and a fixed contact point selectively connected to one of the first to third switch contact points. The oscillator generates the oscillation signal in a cycle that is in accordance with one of the first current amount, a second amount of current flowing through the second switch contact point, and a third amount of current flowing through the third switch contact point.

Another aspect of the present invention is a method for controlling a switching type DC-DC converter for converting an input voltage and generating an output voltage. The DC-DC converter includes an adjustment resistor, an external terminal to which the adjustment resistor is externally connected, and an oscillator. The method includes generating an oscillation signal with the oscillator, generating a control signal for controlling the switching transistor based on the oscillation signal and a signal that is in accordance with an output voltage or output current of the DC-DC converter, and monitoring a first amount of current flowing through the external terminal and generating the oscillation signal in a cycle that is accordance with the monitoring result.

A further aspect of the present invention is a method for controlling a switching type DC-DC converter for converting an input voltage and generating an output voltage. The DC-DC converter includes an adjustment resistor, an external terminal to which the adjustment resistor is externally connected, an oscillator for generating an oscillation signal, and a switch having a first switch contact point connected to the adjustment resistor, second and third switch contact points respectively connected to first and second constant current supplies, and a fixed contact point. The method includes generating a control signal based on the oscillation signal and a signal that is in accordance with an output voltage or output current of the DC-DC converter to control the switching transistor, comparing voltage corresponding to a first amount of current flowing through the external terminal with first and second reference voltages and generating a switch signal in accordance with the comparison result, switching connection of the fixed contact point between any one of the first to third switch contact points in accordance with the switch signal, and generating the oscillation signal in a cycle that is in accordance with one of the first current amount, a second amount of current flowing through the second switch contact point, and a third amount of current flowing through the third switch contact point.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 2:
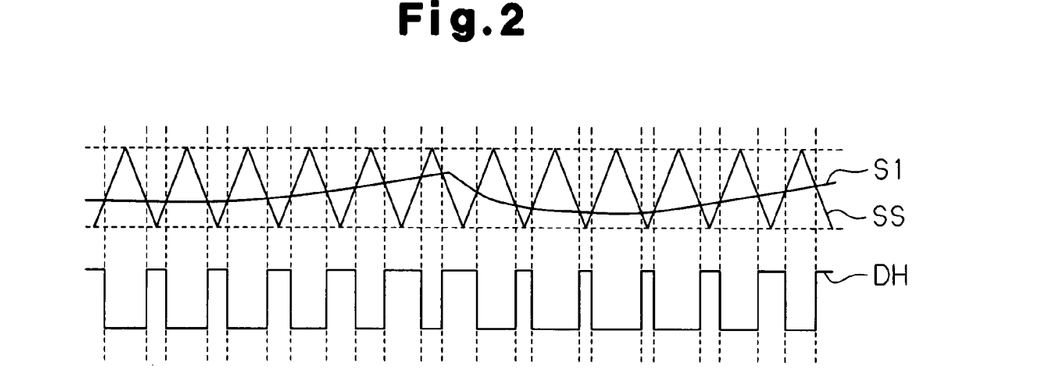
FIG. 2 is an operation waveform diagram of the DC-DC converter of FIG. 1.
Figure 3:
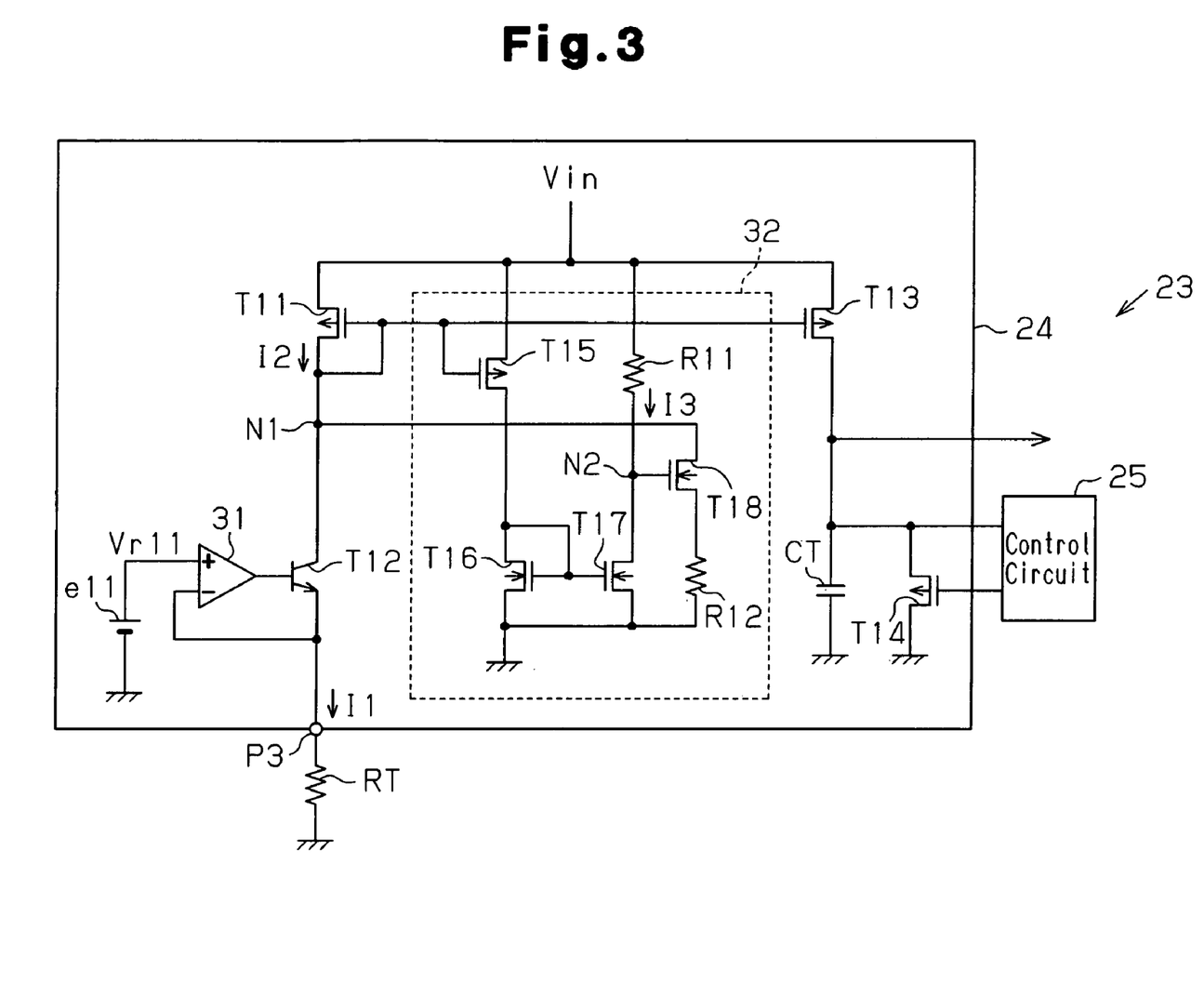
FIG. 3 is a circuit diagram of an oscillator included in the DC-DC converter of FIG. 1.

A first embodiment of the present invention will now be described with reference to FIGS. 1 to 3.

Figure 1:
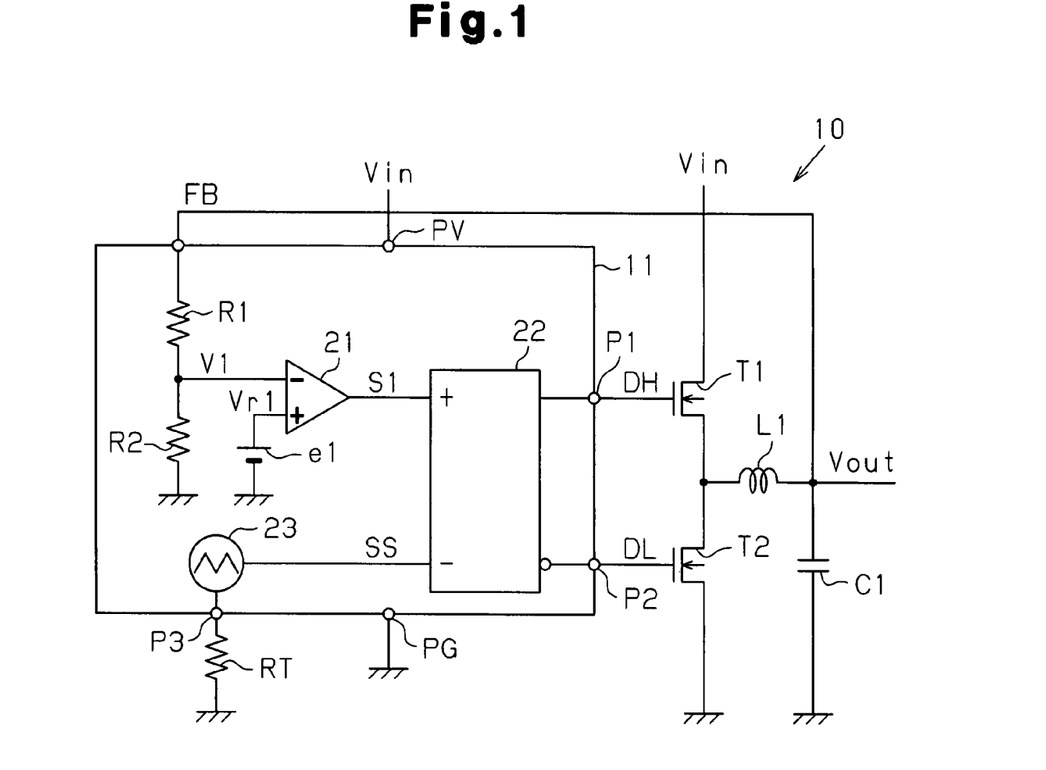
FIG. 1 is a block circuit diagram of a DC-DC converter according to a first embodiment of the present invention.

Referring now to FIG. 1, a voltage-controlled DC-DC converter 10 includes a control circuit 11, a first transistor T1 that functions as a main switching transistor, a second transistor T2 that functions as a synchronous rectifier transistor, a choke coil L1, a smoothing capacitor C1, and an external component such as an adjustment resistor RT for adjusting the frequency.

The control circuit 11 may be integrated as a single semiconductor chip (IC). The control circuit 11 has a terminal P1 to which the first transistor T1 is connected, a terminal P2, to which the second transistor T1 is connected, and an external terminal P3, to which the adjustment resistor RT is connected. The control circuit 11 provides a control signal DH from the terminal P1 to the gate of the first transistor T1 and a control signal DL from the terminal P2 to the gate of the second transistor T2. The first transistor T1 may be an N-channel MOS (metal oxide semiconductor) transistor having a drain receiving an input voltage Vin and a source connected to the second transistor T2. The second transistor T2 may be an N-channel MOS transistor having a drain connected to the first transistor T1 and a source connected to a low-potential power supply (e.g., ground). The first transistor T1 is turned on and off in response to the control signal DH. The second transistor T2 is turned on and off in response to the control signal DL.

The choke coil L1 has a first terminal to which a node between the first transistor T1 and the second transistor T2 is connected, and a second terminal from which an output voltage Vout is output.

The smoothing capacitor C1 for smoothing the output voltage Vout has a first terminal, which is connected to the second terminal of the choke coil L1, and a second terminal, which is connected to ground. The voltage at the second terminal of the choke coil L1, that is, the output voltage Vout, is provided as a feedback to an input stage of the control circuit 11 in the form of a feedback signal FB.

The control circuit 11 has a power supply terminal PV, which is supplied with the input voltage Vin functioning as a power supply voltage, and a power supply terminal PG, which is connected to ground. Each circuit in the control circuit 11 is operated by the input voltage Vin.

The control circuit 11 includes an error amplifier 21, a pulse width modulation (PWM) comparator 22, an oscillator 23, resistors R1 and R2, and a reference power supply e1.

The first resistor R1 has a first terminal, which is provided with the feedback signal FB, and a second terminal, which is connected to a first terminal of the second resistor R2. A second terminal of the second resistor R2 is connected to ground. The first resistor R1 and the second resistor R2 form a voltage dividing circuit and generate a comparison voltage V1 obtained by dividing the voltage of the feedback signal FB. The comparison voltage V1 is input into the error amplifier 21.

The error amplifier 21 has an inversion input terminal, into which the comparison voltage V1, or divided voltage of the output voltage Vout is input, and a non-inversion input terminal, into which a reference voltage Vr1 of the reference power supply e1 is input. The error amplifier 21 outputs an error signal S1 obtained by amplifying the difference between the reference voltage Vr1 and the comparison voltage V1 in accordance with the comparison result between the reference voltage Vr1 and the comparison voltage V1 (divided voltage of the output voltage Vout). In the first embodiment, the level of the error signal S1 increases in accordance with the difference between the comparison voltage V1 input into the inversion input terminal and the reference voltage Vr1 input into the non-inversion input terminal when the comparison voltage V1 is less than the reference voltage Vr1. The level of the error signal S1 decreases in accordance with the difference between the comparison voltage V1 and the reference voltage Vr1 when the comparison voltage V1 is greater than the reference voltage Vr1.

The error signal S1 is provided to the PWM comparator 22. The PWM comparator 22 has a non-inversion input terminal, into which the error signal S1 of the error amplifier 21 is input, and an inversion input terminal, into which an oscillation signal SS of the oscillator 23 is input. The oscillator 23 is a triangular waveform oscillator and connected to one terminal of the adjustment resistor RT. The other terminal of the adjustment resistor RT is connected to ground. The oscillator 23 generates a triangular waveform oscillation signal SS having a frequency determined in accordance with the value of the current flowing from the external terminal P3 to the adjustment resistor RT.

The PWM comparator 22 compares the error signal S1 of the error amplifier 21 with the oscillation signal SS of the oscillator 23 to outputs the complementary control signals DH and DL in accordance with the comparison result. In detail, the PWM comparator 22 outputs a high (H) level control signal DH and a low (L) level control signal DL when the voltage of the error signal S1 is higher than the voltage of the oscillation signal SS. Further, the PWM comparator 22 outputs an L level control signal DH and an H level control signal DL when the voltage of the error signal S1 is lower than the voltage of the oscillation signal SS.

The control signal DH is provided to the first transistor T1 so that the first transistor T1 is turned on and off in response to the control signal DH. The control signal DL is provided to the second transistor T2 so that the second transistor T2 is turned on and off in response to the control signal DL. Thus, when the first transistor T1 is turned on, the second transistor T2 is turned off. When the first transistor T1 is turned off, the second transistor T2 is turned on.

When the first transistor T1 is turned on, the current flowing through a load via the choke coil L1 increases, and the level of the comparison voltage V1 increases. Further, as the current flows through the choke coil L1, energy accumulates in the choke coil L1. When the level of the error signal S1 becomes lower than the level of the oscillation signal SS, the first transistor T1 is turned off and the second transistor T2 is turned on to discharge the energy accumulated in the choke coil L1.

The pulse width of the oscillation signal SS, the error signal S1, and the control signal DH will now be described with reference to FIG. 2. When the output voltage Vout decreases as the first and second transistor T1 and T2 are turned on and off, the level of the error signal S1, which is determined in accordance with the comparison result between the comparison voltage V1 obtained by dividing the output voltage Vout and the reference voltage Vr1, increases. As the level of the error signal S1 increases, the pulse width of the control signal DH widens to lengthen the on-period of the first transistor T1. When the output voltage Vout increases, the level of the error signal S1 decreases. As the level of the error signal S1 decreases, the pulse width of the control signal DL narrows to shorten the on-period of the first transistor T1. This operation is repeated so that the on-period of the first transistor T1 is adjusted in accordance with a change in the output voltage Vout. As a result, the output voltage Vout is controlled to be constant.

The oscillator 23 will now be described with reference to FIG. 3. The oscillator 23 includes an oscillation circuit 24 and a charge-discharge control circuit 25. In the oscillation circuit 24, the input voltage Vin is provided to a first transistor T11. The first transistor T11 may be a P-channel MOS transistor having a source provided with the input voltage Vin and a drain connected to a second transistor T12. The first transistor T11 has a gate connected to its drain. In other words, the first transistor T11 is diode-connected.

The second transistor T12 may be an NPN transistor having a collector connected to the first transistor T11, an emitter connected to the adjustment resistor RT via the external terminal P3, and a base connected to a voltage amplifier 31. The voltage amplifier 31 has an inversion input terminal connected to an emitter of the second transistor T12, a non-inversion input terminal connected to a reference power supply e11, and an output terminal connected to a base of the second transistor T12.

The gate of the first transistor T11 is connected to the gate of a third transistor T13. The third transistor T13 may be a P-channel MOS transistor having a source supplied with the input voltage Vin and a drain connected to a capacitor CT. The first transistor T11 and the third transistor T13 form a current mirror circuit. In the first embodiment, the first and third transistors T11 and T13 have the same size and thus the same electric characteristics. Accordingly, the same amount of current flows through the first transistor T11 and the third transistor T13.

The capacitor CT may be a charging capacitor having a first terminal connected to the third transistor T13 and a second terminal connected to ground. A fourth transistor T14, which functions as a discharging element, is connected in parallel to the capacitor CT. The fourth transistor T14 may be a P-channel MOS transistor having a source connected to the first terminal of the capacitor CT and a drain connected to ground, or the second terminal of the capacitor CT.

The first terminal of the capacitor CT and the gate of the fourth transistor T14 are connected to the charge-discharge control circuit 25. The charge-discharge control circuit 25 monitors the charging voltage of the capacitor CT to control the fourth transistor T14 accordingly. In detail, the capacitor CT is charged with a current flowing through the third transistor T13 when the fourth transistor T14 is turned off. As a result, the voltage at the first terminal of the capacitor CT, or the charging voltage of the capacitor CT, increases. When the fourth transistor T14 is turned on, a discharging current flows from the capacitor CT toward the ground, and the voltage at the first terminal of the capacitor CT decreases.

The charge-discharge control circuit 25 monitors the charging voltage of the capacitor CT, that is, the voltage (charging voltage) at the first terminal. The charge-discharge control circuit 25 turns on the fourth transistor T14 when the charging voltage increases to a first predetermined voltage and turns off the fourth transistor T14 when the charging voltage decreases to a second predetermined voltage. By repeatedly turning the fourth transistor T14 on and off, the voltage at the first terminal of the capacitor CT varies in the form of a generally triangular shape to generate the oscillation signal SS with a substantially triangular waveform. The cycle in which the fourth transistor T14 is turned on and off is the cycle of the oscillation signal SS, and the inverse of the cycle of the oscillation signal SS is the frequency of the oscillation signal SS.

The cycle in which the fourth transistor T14 is turned on and off is determined in accordance with the variation of the voltage at the first terminal of the capacitor CT, that is, the charging and discharging amount of the capacitor CT. Thus, the oscillation signal SS is generated in the cycle determined in accordance with the amount of current supplied to the capacitor CT, that is, the amount of current flowing through the third transistor T13.

The oscillation circuit 24 includes a monitoring circuit 32.

The monitoring circuit 32 includes fifth to eighth transistors T15 to T18 and first and second resistors R11 and R12.

The fifth transistor T15 may be a P-channel MOS transistor having a source supplied with the input voltage Vin, a drain connected to the sixth transistor T16, and a gate connected to the gate of the first transistor T11. The first transistor T11 and the fifth transistor T15 form a current mirror circuit. In the first embodiment, the first and fifth transistors T11 and T15 have the same size and thus the same electric characteristics. Accordingly, the same amount of current flows through the first transistor T11 and the fifth transistor T15. As described above, the first and third transistors T11 and T13 form a current mirror circuit so that the same amount of current flows through the first transistor T11 and the third transistor T13. As a result, the same amount of current flows through the third transistor T13 and the fifth transistor T15.

The sixth transistor T16 may be an N-channel MOS transistor having a source connected to ground, a drain connected to the fifth transistor T15, and a gate connected to the drain of the sixth transistor T16 and to the seventh transistor T17. The seventh transistor T17 may be an N-channel MOS transistor having a source connected to ground, a drain connected to the first resistor R11, and a gate connected to the gate of the sixth transistor T16. The sixth transistor T16 and the seventh transistor T17 form a current mirror circuit. In the first embodiment, the sixth and seventh transistors T16 and T17 have the same size and thus the same electric characteristics. Accordingly, the same amount of current flows through the sixth transistor T16 and the seventh transistor T17.

The first resistor R11 has one terminal connected to the seventh transistor T17 and another terminal supplied with the input voltage Vin. The eighth transistor T18 is connected to a node N2 between the first resistor R11 and the seventh transistor T17. The eighth transistor T18 may be an N-channel MOS transistor having a gate connected to the node N2, a source connected to one terminal of the second resistor R12, and a drain connected to the node N1. The other terminal of the second resistor R12 is connected to ground.

The operation of the oscillator 23 will now be described.

The voltage amplifier 31 amplifies the difference between the reference voltage Vr11 of the reference power supply e11 and the voltage at the external terminal P3, to which the adjustment resistor RT is connected, and outputs the amplified voltage to the base of the second transistor T12. The voltage at the external terminal P3 is dependent on the current flowing through the adjustment resistor RT. When a current I1 flowing through the adjustment resistor RT is small such that the voltage at the external terminal P3 is lower than the reference voltage Vr11, the output voltage of the voltage amplifier 31 increases. As a result, the base current of the second transistor T12 increases. When the base current of the second transistor T12 increases, the emitter current of the second transistor T12 also increases. This increases the current I1 flowing through the adjustment resistor RT.

When the current I1 flowing through the adjustment resistor RT is large such that the voltage at the external terminal P3 is higher than the reference voltage Vr11, the output voltage of the voltage amplifier 31 decreases. As a result, the base current of the second transistor T12 decreases. When the base current of the second transistor T12 decreases, the emitter current of the second transistor T12 also decreases. This decreases the current I1 flowing through the adjustment resistor RT.

The voltage amplifier 31 controls the base current of the second transistor T12 to equalize the reference voltage Vr11 and the voltage at the external terminal P3 to which the adjustment resistor RT is connected. The adjustment resistor RT is connected between the external terminal P3 and the ground. The potential of the ground is 0 V (volts), and the potential at the external terminal P3 is the reference voltage Vr11. Thus, when a resistor with a different resistance is connected between the external terminal P3 and the ground, a current that is determined in accordance with the resistance and the potential difference between the external terminal P3 and the ground flows through the resistor. As a result, the second transistor T12, the voltage amplifier 31, the reference power supply e11, and the externally connected adjustment resistor RT cause the flow of current I1 of which amount is determined in accordance with the resistance of the adjustment resistor RT and form a constant current circuit that controls the current I1 to be constant.

The first transistor T11 connected to the collector of the second transistor T12 that forms the constant current circuit is diode-connected. Thus, a current I2, which is the same as the emitter current of the second transistor T12, flows through the first transistor T11. The first transistor T11 and the third transistor T13 form a current mirror circuit so that the same amount of current as the emitter current of the second transistor T12 flows through the third transistor T13.

The capacitor CT, which is connected in series to the third transistor T13, is charged with a constant current flowing through the third transistor T13. Thus, the charging voltage of the capacitor CT increases as time elapses.

The charging voltage Vc of the capacitor CT is expressed by the next equation.

$$Vc=(Q/C)*t$$

In this equation, C is the capacitance of the capacitor CT, Q is the unit charge amount flowing through the third transistor T13, and t is the elapsed time.

The fourth transistor T14 connected in parallel to the capacitor CT is a discharging switch for discharging the charge Q accumulated in the capacitor CT. The charge-discharge control circuit 25 turns on the fourth transistor T14 and discharges the charge Q accumulated in the capacitor CT when the charging voltage of the capacitor CT increases to a first predetermined voltage. The charge-discharge control circuit 25 turns off the fourth transistor T14 and charges the capacitor CT when the charging voltage of the capacitor CT decreases to a second predetermined voltage due to discharging. This operation is repeated to cause the voltage of the capacitor CT to be shaped into a triangular (saw tooth) waveform. The charging voltage of the capacitor CT increases or decreases in accordance with the amount of current flowing to the capacitor CT, that is, the current flowing through the adjustment resistor RT. The capacitor CT and the reference power supply e11 are incorporated on a chip of the oscillator 23. Thus, the capacitance of the capacitor CT and the reference voltage Vr11 remain unchanged. As a result, the oscillator 23 is oscillated by the amount of current flowing through the adjustment resistor RT, that is, by the frequency determined in accordance with the resistance of the adjustment resistor RT.

The operation of the monitoring circuit 32 will now be described.

When the adjustment resistor RT is connected between the external terminal P3 and the ground, the current I1 determined in accordance with the resistance of the adjustment resistor RT flows through the emitter of the second transistor T12. The drain current I2 of the first transistor T11, that is, the same amount of current as the emitter current I1 of the second transistor T12, flows through the fifth transistor T15, which forms the current mirror circuit together with the first transistor T11, and through the first resistor R11. The potential at the node N2 between the first resistor R11 and the seventh transistor T17 is the potential determined in accordance with the resistance of the first resistor R11 and the seventh transistor T17 and the current I3 flowing through the resistor R11. The eighth transistor T18 of which gate is connected to the node N2 is off because the potential at the node N2 is lower than the potential at the node N1 to which its drain is connected.

When the adjustment resistor RT is in a disconnected state (when at least one of the two terminals of the adjustment resistor RT is disconnected from its connection subject (external terminal P3 or GND)), no current flows through the emitter of the second transistor T12. Thus, no current flows through the seventh transistor T17. When no current flows through the seventh transistor T17, no current flows through the first resistor R11. Thus, the first resistor R11 does not cause a voltage decrease, and the drain voltage of the seventh transistor T17 increases.

When the drain voltage of the seventh transistor T17 increases, the gate voltage of the eighth transistor T18 also increases. This turns on the eighth transistor T18. The drain of the eighth transistor T18 is connected to the node N1. Thus, when the emitter current of the second transistor T12 reaches zero, the eighth transistor T18 is turned on, and current flows through the eighth transistor T18 instead of the second transistor T12. Thus, current also flows through the first transistor T11.

The flow of current through the first transistor T11 results in current flowing again through the seventh transistor T17 and the gate voltage of the eighth transistor T18 decreasing. However, current flows through the eighth transistor T18 in a state in which the gate voltage determined by the voltage decrease caused by the first resistor R11 is balanced with the source voltage determined by the voltage generated by the second resistor R12.

Accordingly, current flows through the first transistor T11, the eighth transistor T18, and the second resistor R12. The same amount of current as the current flowing through the first transistor T11, the eighth transistor T18, and the second resistor R12 charges the capacitor CT. As a result, the oscillator 23 continues oscillating and generates an oscillation signal having a frequency determined by the amount of current flowing through the eighth transistor T18 in accordance with the resistances of the first and second resistors R11 and R12.

When the external terminal P3 is short-circuited with the terminal PV supplied with the input voltage Vin (refer to FIG. 1), no current flows through the adjustment resistor RT, that is, through the emitter of the second transistor T12 in the same manner as described above. In this case, the monitoring circuit 32 operates in the same manner as when the adjustment resistor RT is in the disconnected state. As a result, the oscillator 23 continues oscillating and generates an oscillation signal having a frequency determined by the amount of current flowing through the eighth transistor T18 in accordance with the resistances of the first and second resistors R11 and R12.

The first embodiment has the advantages described below.

(1) The control circuit 11, which includes the oscillator 23 for changing the cycle of the oscillation signal SS in accordance with the resistance of the externally connected adjustment resistor RT, generates the first control signal DH and the second control signal DL for turning the first transistor T1 and the second transistor T2 on and off with the oscillation signal SS and the output voltage Vout. The oscillator 23 includes the monitoring circuit 32 that monitors the current I1 flowing through the external terminal P3, to which the adjustment resistor RT is connected. When the adjustment resistor RT is in a disconnected state (e.g., state in which the adjustment resistor is disconnected from the external terminal P3 or ground, state in which the terminal connected to the adjustment resistor is short-circuited with the terminal of the control circuit supplied with the power supply voltage, or state in which the two terminals of the adjustment resistor are short-circuited to have a high resistance), the amount of current flowing through the external terminal P3 to which the adjustment resistor RT is connected becomes zero or extremely small. In this case, the oscillator 23 generates an oscillation signal in a cycle determined by the current amount that is in accordance with the resistances of the first and second resistors R11 and R12. As a result, the DC-DC converter 10 operates stably. Further, the DC-DC converter 10 is prevented from functioning erroneously and thus does not have the first transistor T1 continue to function in an on-state.

(2) When the adjustment resistor RT is not connected to the external terminal P3 or when the external terminal P3 is connected to the terminal PV, the monitoring circuit 32 operates in the same manner as when the adjustment resistor RT is disconnected. As a result, the oscillator 23 generates an oscillation signal in a cycle determined by the current amount that is in accordance with the resistances of the first and second resistors R11 and R12 of the monitoring circuit 32. Thus, when the oscillator 23 is only required to generate an oscillation signal in a preset cycle, the adjustment resistor RT does not need to be connected when the DC-DC converter 10 is used. This eliminates the burden of connecting the adjustment resistor RT.

A second embodiment of the present invention will now be described with reference to FIG. 4. To avoid redundancy, like or same reference numerals are given to those components that are the same as the corresponding components of the first embodiment. Such components will not be described in detail.

Figure 4:
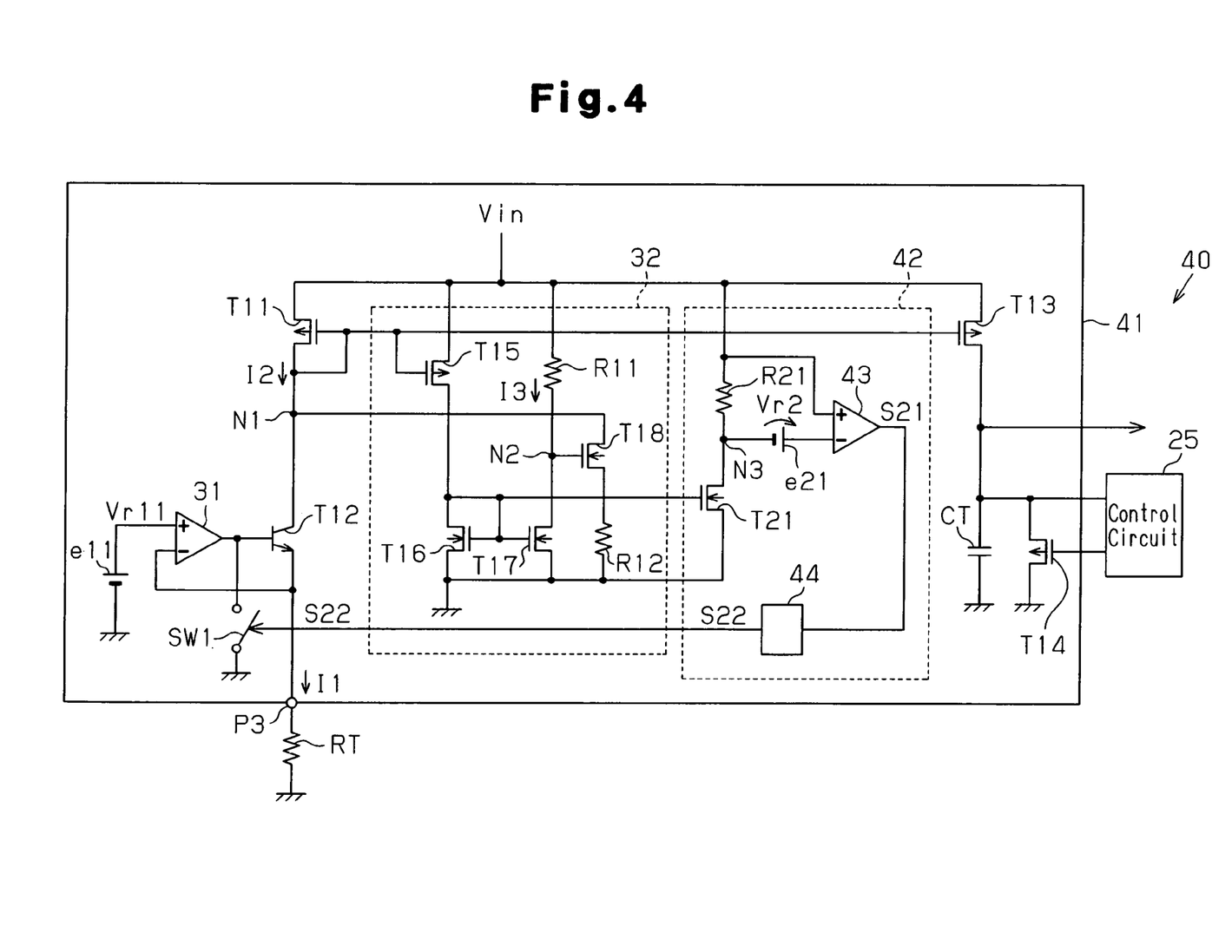
FIG. 4 is a circuit diagram of an oscillator according to a second embodiment of the present invention.

As shown in FIG. 4, an oscillator 40 includes an oscillation circuit 41 and a charge-discharge control circuit 25. The oscillation circuit 41 includes a switch SW1 and a control circuit (switch control circuit) 42 in addition to the components of the first embodiment.

The switch SW1 has a first terminal connected to the base of the second transistor T12 and a second terminal connected to ground. The switch SW1 is turned on and off by the control circuit 42. The switch SW1 and the control circuit 42 function as a breaking circuit.

The control circuit 42 includes a resistor R21, a transistor T21, a reference power supply e21, a voltage comparator 43, and a flip-flop circuit 44.

The transistor T21 may be an N-channel MOS transistor having a source connected to ground, a drain connected to the resistor R21, and a gate connected to the gate of the sixth transistor T16 in the monitoring circuit 32. The sixth transistor T16 and the transistor T21 form a current mirror circuit. In the second embodiment, the sixth transistor T16 and the transistor T21 have the same size and thus the same electric characteristics. Accordingly, the same amount of current flows through the sixth transistor T16 (seventh transistor T17 of the monitoring circuit 32) and the transistor T21.

The resistor R21 has a first terminal supplied with an input voltage Vin and a second terminal connected to the transistor T21. Thus, when current flows through the resistor R21, the potential at the second terminal of the resistor R21 becomes lower than the potential (input voltage Vin) at the first terminal of the resistor R21 due to the current flowing through the resistor R21.

The reference power supply e21 has a negative terminal, which is connected to a node N3 between the resistor R21 and the transistor T21, and a positive terminal, which is connected to an inversion input terminal of a voltage comparator 43. The voltage comparator 43 has a non-inversion input terminal connected to a high-potential terminal of the resistor R21 and an output terminal connected to the flip-flop circuit 44.

The voltage comparator 43 compares the voltage generated by the current flowing through the resistor R21 with a reference voltage Vr2 of the reference power supply e21. Thus, a potential difference that is determined in accordance with the amount of current flowing through the resistor R21 is generated between the two terminals of the resistor R21. The reference power supply e21 adds a positive offset voltage to the potential at the second terminal of the resistor R21 (node N3).

The reference voltage Vr2 of the reference power supply e21 is set to be slightly higher than the potential difference generated between the two terminals of the resistor R21 in a normal state (when the adjustment resistor RT is connected between the external terminal P3 and ground and the current I1 flows through the adjustment resistor RT). Thus, in a normal state, the voltage at the inversion input terminal of the voltage comparator 43 is higher than the voltage at the non-inversion input terminal of the voltage comparator 43. Thus, the voltage comparator 43 outputs an L level signal S21. When the current flowing through the resistor R21 becomes greater than that flowing in a normal state, the potential difference generated between the two terminals of the resistor R21 is greater than the reference voltage Vr2. Thus, the voltage comparator 43 outputs an H level signal S21.

The flip-flop circuit 44 may be an RS (reset-set) flip-flop circuit having a set terminal into which the output signal S21 of the voltage comparator 43 is input. When an H level output signal S21 is output from the voltage comparator 43, the flip-flop circuit 44 stores the output signal S21 and outputs an H level switch signal S22. For example, when the DC-DC converter is activated, a reset signal (not shown) for initializing the DC-DC converter is input into a reset terminal of the flip-flop circuit 44. Thus, the flip-flop circuit 44 outputs an L level switch signal S22.

The switch SW1 is turned on in response to an H level switch signal S22 and turned off in response to an L level switch signal S22. Accordingly, the switch SW1 is turned on in response to an H level signal S21 output by the voltage comparator 43 and connects the base of the second transistor T12 to the ground. The flip-flop circuit 44 maintains the switch SW1 in the on-state of.

In the oscillator 4, the monitoring circuit 32 operates in the same manner as the oscillator 23 of the first embodiment when the adjustment resistor RT is connected between the external terminal P3 and the ground, when the adjustment resistor RT is in the disconnected state, and when the external terminal P3 is short-circuited with the terminal PV supplied with the input voltage Vin (refer to FIG. 1).

When the adjustment resistor RT is connected between the external terminal P3 and ground, the same amount of current as the emitter current of the second transistor T12 flows through the resistor R21 of the control circuit 42. In this state, the potential difference generated between the two terminals of the resistor R21 is smaller than the reference voltage Vr2 of the reference power supply e21. Thus, the voltage comparator 43 outputs an L level signal S21, and the flip-flop circuit 44 outputs an L level switch signal S22. This turns off the switch SW1.

When the two terminals of the adjustment resistor RT are short-circuited due to condensation or the like, the emitter of the second transistor T12 is connected to ground so that the current flowing through the second transistor T12 becomes greater than the current that flows in a normal state. The same amount of current as the emitter current of the second transistor T12 flows through the resistor R21. In this state, the potential difference generated between the two terminals of the resistor R21 is greater than the reference voltage Vr2 of the reference power supply e21. Thus, the voltage comparator 43 outputs an H level signal S21, and the flip-flop circuit 44 outputs an H level switch signal S22. As a result, the switch SW1 is turned on. The switch SW1 that is turned on clamps the base potential of the second transistor T12 to the ground potential. As a result, the second transistor T12 is turned off and current does not flow through the second transistor T12.

A state in which current does not flow to the second transistor T12 is equivalent to a disconnected state of the adjustment resistor RT. In this state, the monitoring circuit 32 causes the current determined by the first and second resistors R11 and R12 to flow to the first transistor T11, or the third transistor T13. As a result, the oscillator 23 continues oscillating and generates an oscillation signal with a frequency determined by the amount of current flowing through the eighth transistor T18 in accordance with the resistances of the first and second resistors R11 and R12.

The second embodiment has the advantages described below.

(1) The oscillator 40 breaks the route for supplying current to the adjustment resistor RT by turning on the switch SW1 and connecting the base of the second transistor T12 to the ground when the two terminals of the adjustment resistor RT are short-circuited. Thus, when the adjustment resistor RT is short-circuited by condensation or the like, the route for supplying current to the adjustment resistor RT is broken to create a state equivalent to the disconnected state of the adjustment resistor RT. As a result, the oscillator 40 generates an oscillation signal in a cycle corresponding to a predetermined current amount, and the DC-DC converter operates stably. Further, the breakage of the route for supplying current to the adjustment resistor RT prevents the consumption current of the DC-DC converter from increasing during a short-circuit.

(2) When the external terminal P3 is connected to the terminal PG, the monitoring circuit 32 operates in the same manner as when the adjustment resistor RT is short-circuited, and the oscillator 23 generates an oscillation signal in a cycle determined by the amount of current that is in accordance with the resistances of the first and second resistors R11 and R12. Thus, when the oscillator 23 is only required to generate an oscillation signal in a preset signal, the external terminal P3 to which the adjustment resistor RT is connected simply needs to be connected to the ground. This facilitates the used of the DC-DC converter.

A third embodiment of the present invention will now be described with reference to FIG. 5. To avoid redundancy, like or same reference numerals are given to those components that are the same as the corresponding components of the first and second embodiments. Such components will not be described in detail.

Figure 5:
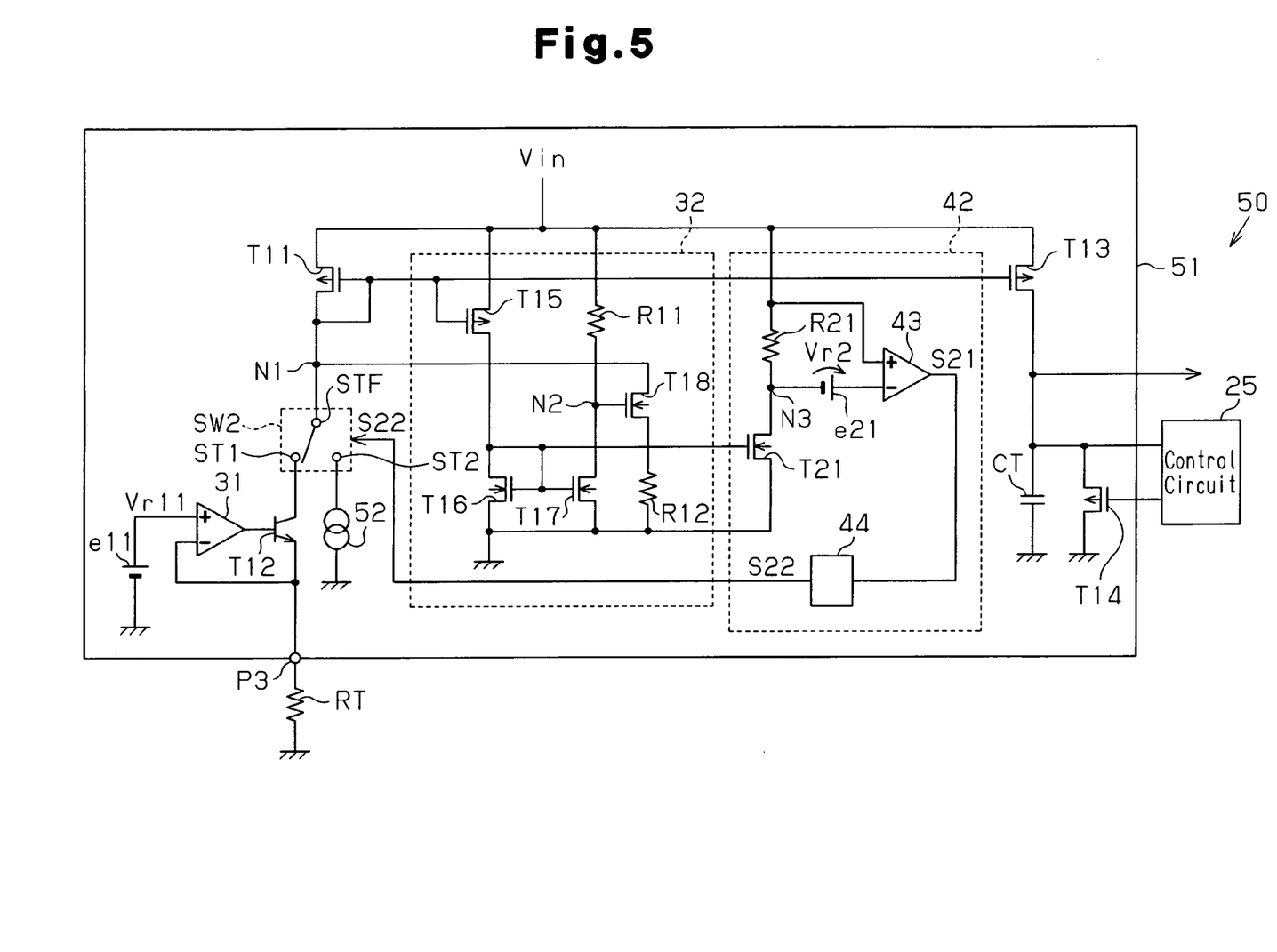
FIG. 5 is a circuit diagram of an oscillator according to a third embodiment of the present invention.

As shown in FIG. 5, an oscillator 50 includes an oscillation circuit 51 and a charge-discharge control circuit 25. The oscillation circuit 51 includes a switch SW2 and a constant current supply 52 instead of the switch SW1 of the second embodiment.

The switch SW2 has a fixed contact point STF and two switch contact points ST1 and ST2. The fixed contact point STF of the switch SW2 is connected to the drain of the first transistor T11, the first switch contact point ST1 is connected to a collector of the second transistor T12, and the second switch contact point ST2 is connected to the constant current supply 52. The switch SW2 connects the fixed contact point STF to the first switch contact point ST1 or to the second switch contact point ST2 based on the switch signal S22 from a flip-flop circuit 44. In the third embodiment, the switch SW2 connects the fixed contact point STF to the first switch contact point ST1 to connect the first transistor T11 and the second transistor T12 in response to an H level switch signal S22. The switch SW2 connects the fixed contact point STF to the second switch contact point ST2 to connect the first transistor T11 and the constant current supply 52 in response to an L level switch signal S22.

When an adjustment resistor RT is connected between the external terminal P3 and ground, the switch SW1 connects the first transistor T11 and the second transistor T12 so that the oscillator 50 generates an oscillation signal having a frequency determined in accordance with the amount of current flowing through the adjustment resistor RT.

When the adjustment resistor RT is in a disconnected state or when the external terminal P3 is short-circuit with the terminal PV supplied with an input voltage Vin (refer to FIG. 1), the monitoring circuit 32 operates in the same manner as in the first embodiment. More specifically, the monitoring circuit 32 causes current to flow to the first transistor T11 and the third transistor T13 in accordance with the resistances of the first and second resistors R11 and R12. Further, the oscillator 50 generates an oscillation signal with a frequency determined by the amount of current flowing through the third transistor T13.

When the two terminals of the adjustment resistor RT are short-circuited, a control circuit 42 outputs an L level signal S21, and the switch SW2 connects the first transistor T11 to the constant current supply 52. As a result, the same amount of current as the current flowing from the constant current supply 52 (second current amount) flows through the first transistor T11 and the third transistor T13. Further, the oscillator 50 generates an oscillation signal with a frequency determined by the amount of current flowing through the third transistor T13.

The third embodiment has the advantages described below.

(1) The oscillator 50 generates an oscillation signal in a cycle determined by the amount of current that is accordance with the resistances of the first and second resistors R11 and R12 in the monitoring circuit 32 when the adjustment resistor RT is in the disconnected state. Further, the oscillator 50 generates an oscillation signal in a range determined in accordance with the amount of current of the constant current supply 52 by switching the switch SW2 when the two terminals of the adjustment resistor RT are short-circuited. Thus, when the adjustment resistor RT is short-circuited by condensation or the like, the oscillator 50 generates an oscillation signal in a cycle corresponding to the amount of current flowing through the constant current supply 52. Thus, the DC-DC converter operates stably. The amount of current flowing through the adjustment resistor RT is set differently when the adjustment resistor RT is in the disconnected state and when the adjustment resistor RT is short-circuited. This enables the state of the adjustment resistor RT to be identified based on the cycle (frequency) of the oscillation signal.

A fourth embodiment of the present invention will now be described with reference to FIG. 6. To avoid redundancy, like or same reference numerals are given to those components that are the same as the corresponding components of the first embodiment. Such components will not be described in detail.

Figure 6:
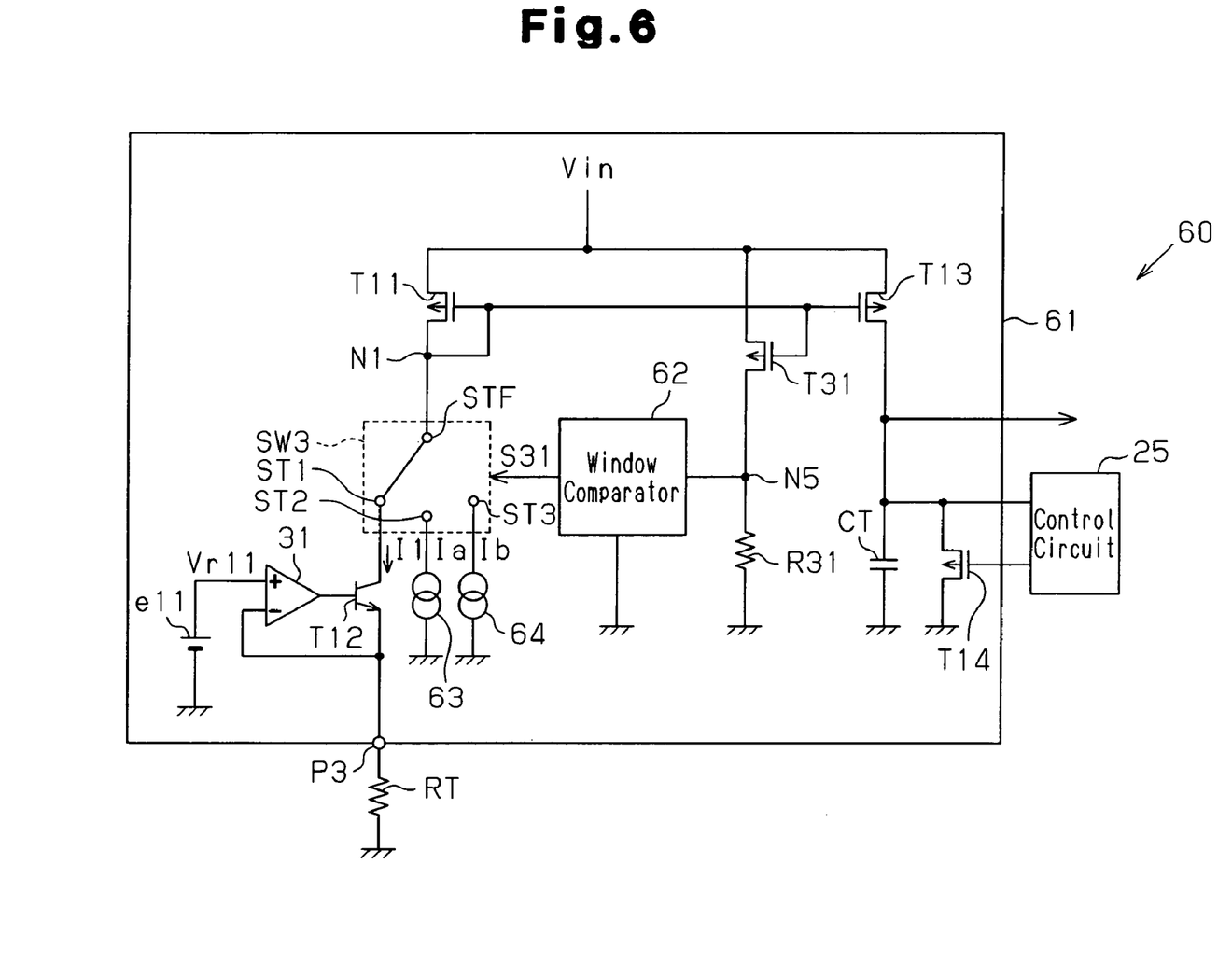
FIG. 6 is a circuit diagram of an oscillator according to a fourth embodiment of the present invention.

As shown in FIG. 6, an oscillator 60 includes an oscillation circuit 61 and the charge-discharge control circuit 25. The oscillation circuit 61 includes a switch SW3 connected between the first transistor T11 and second transistor T12. The switch SW3 has a fixed contact point STF and three switch contact points ST1, ST2, and ST3. The fixed contact point STF is connected to the drain of the first transistor T11, the first switch contact point ST1 is connected to a collector of the second transistor T12, the second switch contact point ST2 is connected to a first constant current supply 63, and the third switch contact point ST3 is connected to a second constant current supply 64. The first constant current supply 63 supplies a current Ia, and the second constant current supply 64 supplies a current Ib. The currents Ia and Ib differ in amounts from a collector current I1 that is caused to flow by an adjustment resistor RT through the second transistor T12.

A transistor T31 is connected to the gate of the first transistor T11. The transistor T31 may be a P-channel MOS transistor having a source supplied with an input voltage Vin, a drain connected to one terminal of a resistor R31, and a gate connected to the gate of the first transistor T11. The other terminal of the resistor R31 is connected to ground. The first transistor T11 and the transistor T31 form a current mirror circuit. In the fourth embodiment, the first transistor T11 and the transistor T31 have the same size and thus the same electric characteristics. As a result, the same amount of current flows through the first transistor T11 and the transistor T31.

A node N5 between the transistor T31 and the resistor R31 is connected to a window comparator 62. The window comparator 62 includes two comparators and two reference power supplies respectively connected to the two comparators. The two reference power supplies have different reference voltages. Each comparator compares the reference voltage supplied from the corresponding reference power supply with the voltage at the node N5 and then outputs a signal based on the comparison result. The window comparator 62 generates a two-bit control signal S31.

In the fourth embodiment, the reference voltages of the two reference power supplies are referred to as a first reference voltage and a second reference voltage. When the voltage at the node N5 is less than or equal to the first reference voltage, when the voltage at the node N5 is between the first reference voltage and the second reference voltage, and when the voltage at the node N5 is greater than or equal to the second reference voltage, the window comparator 62 outputs a control signal S31 having a corresponding value.

The first and second reference voltages are set in accordance with the state of the adjustment resistor RT that is externally connected to the DC-DC converter. The first reference voltage is lower than the second reference voltage. The first reference voltage is set to be lower than the voltage at the node N5 when the adjustment resistor RT is connected in a normal state and the current I1 flows through the adjustment resistor RT. Further, the first reference voltage is set to be higher than the voltage at the node N5 when the two terminals of the adjustment resistor RT are short-circuited. The second reference voltage is set to be higher than the voltage at the node N5 when the adjustment resistor RT is connected in a normal state and the current I1 flows through the adjustment resistor RT. Further, the second reference voltage is set to be lower than the voltage at the node N5 when the adjustment resistor RT is in a disconnected state.

In the fourth embodiment, the window comparator 62 outputs a control signal S31 indicating a value of "01" when the voltage at the node N5 is equal to or lower than the first reference voltage, a control signal S31 indicating a value of "00" when the voltage at the node N5 is between the first reference voltage and the second reference voltage, and a control signal S31 indicating a value of "10" when the voltage at the node N5 is equal to or greater than the second reference voltage. The value of the control signal S31 is a binary number.

The fixed contact point STF of the switch SW3 is connected to one of the switch contact points ST1, ST2, and ST3 in accordance with the value of the control signal S31. In the fourth embodiment, the switch SW3 connects the fixed contact point STF to the first switch contact point ST1 in response to a control signal S31 indicating a value of 00, connects the fixed contact point STF to the second switch contact point ST2 in response to a control signal S31 indicating a value of 10, and connects the fixed contact point STF to the third switch contact point ST3 in response to a control signal S31 indicating a value of 01.

As described above, the value of the control signal S31 is based on the comparison result between the voltage at the node N5 and the first and second reference voltages and corresponds to the connection state of the adjustment resistor RT. Thus, when the adjustment resistor RT is connected in a normal state, the switch SW3 connects the fixed contact point STF to the first switch contact point ST1. As a result, the first transistor T11 is connected to the second transistor T12, and the capacitor CT is charged or discharged by the current I1 flowing through the adjustment resistor RT. As a result, the oscillator 60 generates an oscillation signal with a frequency determined by the amount of current flowing through the adjustment resistor RT, that is, the resistance of the adjustment resistor RT.

The switch SW3 connects the fixed contact point STF to the second switch contact point ST2 when the adjustment resistor RT is in a disconnected state. This connects the first transistor T11 to the first constant current supply 63 and charges the capacitor CT with the current Ia flowing through the first constant current supply 63. As a result, the oscillator 60 generates an oscillation signal with a frequency determined in accordance with the current Ia of the first constant current supply 63.

The switch SW3 connects the fixed contact point STF to the third switch contact point ST3 when the two terminals of the adjustment resistor RT are short-circuited. This connects the first transistor T11 to the second constant current supply 64 and charges the capacitor CT with the current Ib flowing through the second constant current supply 64. As a result, the oscillator 60 generates an oscillation signal with a frequency determined in accordance with the current Ib of the second constant current supply 64.

The fourth embodiment has the advantages described below.

(1) The window comparator 62 of the oscillator 60 receives voltage that is in accordance with the amount of current flowing through the adjustment resistor RT, compares the received voltage with the first and second reference voltages, and generates the control signal S31 based on the comparison result. In response to the control signal S31, the switch SW3 connects the fixed contact point STF to one of the first switch contact point ST1, to which the adjustment resistor RT is connected, and the second and third switch contact points ST2 and ST13, to which the constant current supplies 63 and 64 are respectively connected. As a result, the oscillator 60 generates an oscillation signal in a cycle determined by the amount of current flowing through the adjustment resistor RT when the adjustment resistor RT is connected in a normal state. Further, the oscillator 60 generates an oscillation signal in a cycle determined by the current Ia of the constant current supply 63 connected to the second switch contact point ST2 when the adjustment resistor RT is in a disconnected state. Further, the oscillator 60 generates an oscillation signal in a cycle determined by the current Ib of the constant current supply 64 connected to the third switch contact point ST3 when the adjustment resistor RT is short-circuited. As a result, the DC-DC converter operates stably. The current Ia of the constant current supply 63 connected to the second switch contact point ST2 and the constant current supply 64 connected to the third switch contact point ST3 are set differently.

This enables the state of the adjustment resistor RT to be identified based on the cycle (frequency) of the oscillation signal.

It should be apparent to those skilled in the art that the present invention may be embodied in many other specific forms without departing from the spirit or scope of the invention. Particularly, it should be understood that the present invention may be embodied in the following forms.

Figure 7:
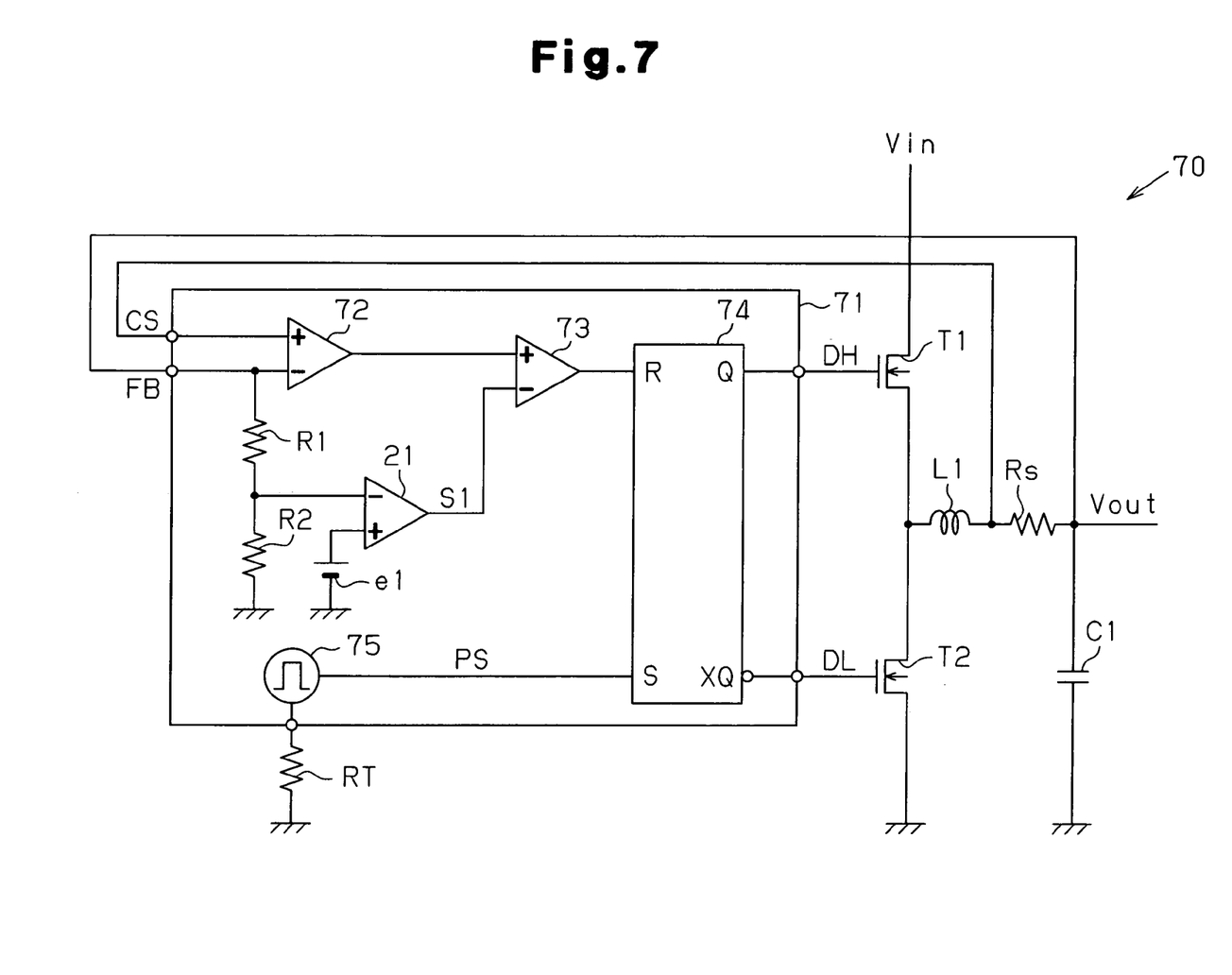
FIG. 7 is a block circuit diagram of a DC-DC converter according to a fifth embodiment of the present invention.

Although the first to fourth embodiments are applied to a voltage-controlled step-down DC-DC converter, the present invention may be embodied in a current-controlled step-down DC-DC converter. FIG. 7 shows a current-controlled step-down DC-DC converter 70 according to a fifth embodiment of the present invention. The DC-DC converter 70 includes a control circuit 71, a first transistor T1, a second transistor T2, a choke coil L1, a smoothing capacitor C1, and a current detection resistor Rs. An output voltage Vout is output via the current detection resistor Rs.

A voltage amplifier 72 of the control circuit 71 receives feedback signals CS and FB respectively having two terminal voltages of the current detection resistor Rs. The voltage amplifier 72 amplifies the voltage difference generated between the two terminals of the current detection resistor Rs based on an output current flowing through the current detection resistor Rs. Then, the voltage amplifier 72 outputs the amplified voltage to a comparator 73. An error amplifier 21 of the control circuit 71 generates an error signal S1 obtained by amplifying the voltage difference between the voltage of the feedback signal FB, that is, the voltage obtained by dividing the output voltage Vout using resistors R1 and R2, and an output voltage of a reference power supply e1. The error signal S1 is provided to the comparator 73.

The comparator 73 compares the output voltage of the voltage amplifier 72 with the voltage of the error signal S1 of the error amplifier 21. Then, the comparator 73 outputs an H level output signal to a reset terminal R of a flip-flop circuit 74 when the output voltage of the voltage amplifier 72 is higher than the voltage of the error signal S1 of the error amplifier 21. When the output voltage of the voltage amplifier 72 is lower than the voltage of the error signal S1, the voltage amplifier 72 outputs an L level output signal to the reset terminal R.

A pulse signal PS having a constant frequency is input into a set terminal S of the flip-flop circuit 74 from an oscillator 75. The oscillator 75, which is a square-wave oscillator, includes the oscillators 23, 40, 50, and 60 of the above embodiments and a wave-shaping circuit (not shown). An adjustment resistor RT functioning as an external element is connected to the oscillator 75 via an external terminal of the control circuit 71. The oscillator 75 generates a pulse signal PS in a cycle determined by the current flowing through the adjustment resistor RT. The oscillator 75 generates a pulse signal PS in a cycle determined by the current set in the circuit in accordance with the connection state of the adjustment resistor RT.

When an H level signal is input into the set terminal S, the flip-flop circuit 74 outputs an H level control signal DH from its output terminal Q and outputs an L level control signal DL from its inversion output terminal XQ. When an H level signal is input into the reset terminal R, the flip-flop circuit 74 outputs an L level control signal DH from the output terminal Q and outputs an H level control signal DL from the inversion output terminal XQ. The control signal DH is provided to the gate of the first transistor T1, and the control signal DL is provided to the gate of the second transistor T2. The fifth embodiment has the same advantages as the advantages of the first to fourth embodiments.

The present embodiment may be embodied in a step-up DC-DC converter, a step-up/step-down DC-DC converter, and a DC-DC converter that generates a negative potential.

In the above embodiments, the output second transistor T2 connected to the control circuit 11 may be replaced by a diode.

The present examples and embodiments are to be considered as illustrative and not restrictive, and the invention is not to be limited to the details given herein, but may be modified within the scope and equivalence of the appended claims.

What is claimed is:

1. A switching type DC-DC converter for converting an input voltage and generating an output voltage, the DC-DC converter comprising:
    an adjustment resistor;
    a control circuit that generates a control signal and includes an external terminal to which the adjustment resistor is externally connected; and
    a switching transistor connected to the control circuit and turned on or off in accordance with the control signal;
    wherein the control circuit includes an oscillator that generates an oscillation signal, with the control circuit generating the control signal based on the oscillation signal and a signal that is in accordance with an output voltage or output current of the DC-DC converter, wherein the oscillator includes:
        a first transistor to which the input voltage is provided;
        a second transistor arranged between the first transistor and the external terminal; and
        a third transistor, which is coupled to a first node between the first transistor and the second transistor, to a second node between a first resistor to which the input voltage is provided and a transistor coupled to around, and to a second resistor coupled to ground; and
    the oscillator monitors a first amount of current flowing through the external terminal of the control circuit by the third transistor monitoring a state of the first node and generates the oscillation signal in a cycle that is in accordance with the monitoring result and resistance values of the first resistor and the second resistor.

2. The DC-DC converter according to claim 1, wherein the oscillator includes a breaking circuit for breaking a route for supplying current to the adjustment resistor when the first current amount is greater than a predetermined amount.

3. The DC-DC converter according to claim 2, wherein the oscillator generates the oscillation signal in a cycle corresponding to a second current amount differing from the first current amount when the first current amount is greater than the predetermined amount.

4. The DC-DC converter according to claim 1, wherein the oscillator includes:
    a constant current circuit that generates current in accordance with the resistance of the adjustment resistor;
    a capacitor charged with the same amount of current as the current generated by the constant current circuit; and
    a discharging element that is connected in parallel to the capacitor and turned on or off in accordance with a charging voltage of the capacitor.

5. A switching type DC-DC converter for converting an input voltage and generating an output voltage, the DC-DC converter comprising:
    an adjustment resistor;
    a control circuit that generates a control signal and includes an external terminal to which the adjustment resistor is externally connected; and a switching transistor connected to the control circuit and turned on or off in accordance with the control signal;

wherein the control circuit includes an oscillator that generates an oscillation signal, with the control circuit generating the control signal based on the oscillation signal and a signal that is in accordance with an output voltage or output current of the DC-DC converter, the oscillator including:

a window comparator having first and second reference voltages and receiving voltage corresponding to a first amount of current flowing through the external terminal of the control circuit to compare the received voltage with the first and second reference voltages and generate a switch signal in accordance with the comparison result;

first and second constant current supplies;

a first transistor to which the input voltage is provided;

a second transistor arranged between the first transistor and the external terminal; and a switch that is coupled between the first and second transistors and is controlled to perform switching in accordance with the switch signal and includes a first switch contact point connected to the adjustment resistor, second and third switch contact points respectively connected to the first and second constant current supplies, and a fixed contact point selectively connected to one of the first to third switch contact points, with the oscillator generating the oscillation signal in a cycle that is in accordance with one of the first current amount, a second amount of current flowing through the second switch contact point, and a third amount of current flowing through the third switch contact point.

6. The DC-DC converter according to claim 5, wherein the oscillator includes:

a constant current circuit that generates current in accordance with the resistance of the adjustment resistor;

a capacitor charged with the same amount of current as the current generated by the constant current circuit; and a discharging element that is connected in parallel to the capacitor and turned on or off in accordance with a charging voltage of the capacitor.

7. A control circuit incorporated in a switching type DC-DC converter for converting an input voltage and generating an output voltage, the DC-DC converter including an adjustment resistor and a switching transistor, the control circuit comprising:

an external terminal to which the adjustment resistor is externally connected; and an oscillator for generating an oscillation signal and including:

a first transistor to which the input voltage is provided;

a second transistor arranged between the first transistor and the external terminal; and a third transistor, which is coupled to a first node between the first transistor and the second transistor, to a second node between a first resistor to which the input voltage is provided and a transistor coupled to around, and to a second resistor coupled to ground;

wherein the control circuit generates a control signal based on the oscillation signal and a signal that is in accordance with an output voltage or output current of the DC-DC converter to turn the switching transistor on or off; and the oscillator monitors a first amount of current flowing through the external terminal by the third transistor monitoring a state of the first node and generates the oscillation signal in a cycle that is in accordance with the monitoring result and resistance values of the first resistor and the second resistor.

8. The control circuit according to claim 7, wherein the oscillator includes a breaking circuit for breaking a route for supplying current to the adjustment resistor when the first current amount is greater than a predetermined amount.

9. The control circuit according to claim 8, wherein the oscillator generates the oscillation signal in a cycle corresponding to a second current amount differing from the first current amount when the first current amount is greater than the predetermined amount.

10. The control circuit according to claim 7, wherein the oscillator includes:

a constant current circuit that generates current in accordance with the resistance of the adjustment resistor;

a capacitor charged with the same amount of current as the current generated by the constant current circuit; and a discharging element that is connected in parallel to the capacitor and turned on or off in accordance with a charging voltage of the capacitor.

11. A control circuit incorporated in a switching type DC-DC converter for converting an input voltage and generating an output voltage, the DC-DC converter including an adjustment resistor and a switching transistor, the control circuit comprising:

an external terminal to which the adjustment resistor is externally connected; and an oscillator for generating an oscillation signal;

wherein the control circuit generates a control signal based on the oscillation signal and a signal that is in accordance with an output voltage or output current of the DC-DC converter to turn the switching transistor on or off;

the oscillator including:

a window comparator having first and second reference voltages and receiving voltage corresponding to a first amount of current flowing through the external terminal to compare the received voltage with the first and second reference voltages and generate a switch signal in accordance with the comparison result;

first and second constant current supplies;

a first transistor to which the input voltage is provided;

a second transistor arranged between the first transistor and the external terminal; and a switch that is coupled between the first and second transistors and is controlled to perform switching in accordance with the switch signal and includes a first switch contact point connected to the adjustment resistor, second and third switch contact points respectively connected to the first and second constant current supplies, and a fixed contact point selectively connected to one of the first to third switch contact points, with the oscillator generating the oscillation signal in a cycle that is in accordance with one of the first current amount, a second amount of current flowing through the second switch contact point, and a third amount of current flowing through the third switch contact point.

12. The control circuit according to claim 11, wherein the oscillator includes:

a constant current circuit that generates current in accordance with the resistance of the adjustment resistor;

a capacitor charged with the same amount of current as the current generated by the constant current circuit; and a discharging element that is connected in parallel to the capacitor and turned on or off in accordance with a charging voltage of the capacitor.

13. A method for controlling a switching type DC-DC converter for converting an input voltage and generating an output voltage, the DC-DC converter including an adjustment resistor, an external terminal to which the adjustment resistor is externally connected, and an oscillator, the method comprising:

generating an oscillation signal with the oscillator, the oscillator including: a first transistor to which the input voltage is provided; a second transistor arranged between the first transistor and the external terminal; and a third transistor, which is coupled to a first node between the first transistor and the second transistor, to a second node between a first resistor to which the input voltage is provided and a transistor coupled to ground, and to a second resistor coupled to ground;

generating a control signal for controlling the switching transistor based on the oscillation signal and a signal that is in accordance with an output voltage or output current of the DC-DC converter; and monitoring a first amount of current flowing through the external terminal by the third transistor monitoring a state of the first node and generating the oscillation signal in a cycle that is in accordance with the monitoring result and resistance values of the first resistor and the second resistor.

14. The method according to claim 13, wherein said generating an oscillation signal includes breaking a route for supplying current to the adjustment resistor when the first current amount is greater than a predetermined amount.

15. The method according to claim 14, wherein said generating an oscillation signal includes generating the oscillation signal in a cycle corresponding to a second current amount differing from the first current amount when the first current amount is greater than the predetermined amount.

16. The method according to claim 13, wherein said generating an oscillation signal includes:

supplying a capacitor with current that is in accordance with the resistance of the adjustment resistor; and generating the oscillation signal in a cycle that is in accordance with current flowing through the adjustment resistor by turning a discharge element connected in parallel to the capacitor on or off in accordance with a charging voltage of the capacitor.

17. A method for controlling a switching type DC-DC converter for converting an input voltage and generating an output voltage, the DC-DC converter including an adjustment resistor, an external terminal to which the adjustment resistor is externally connected, an oscillator for generating an oscillation signal, and a switch having a first switch contact point connected to the adjustment resistor, second and third switch contact points respectively connected to first and second constant current supplies, and a fixed contact point, the method comprising:

generating a control signal based on the oscillation signal and a signal that is in accordance with an output voltage or output current of the DC-DC converter to control the switching transistor;

comparing voltage corresponding to a first amount of current flowing through the external terminal with first and second reference voltages and generating a switch signal in accordance with the comparison result;

switching, with the switch that is coupled between a first transistor to which the input voltage is provided and a second transistor arranged between the first transistor and the external terminal, connection of the fixed contact point between any one of the first to third switch contact points in accordance with the switch signal; and generating the oscillation signal in a cycle that is in accordance with one of the first current amount, a second amount of current flowing through the second switch contact point, and a third amount of current flowing through the third switch contact point.

18. The method according to claim 17, wherein said generating the oscillation signal includes:

supplying a capacitor with current that is in accordance with the resistance of the adjustment resistor; and generating the oscillation signal in a cycle that is in accordance with current flowing through the adjustment resistor by turning a discharge element connected in parallel to the capacitor on or off in accordance with a charging voltage of the capacitor.

* * * * *